United States Patent
Vigild et al.

(10) Patent No.: US 11,341,791 B2
(45) Date of Patent: May 24, 2022

(54) METHOD FOR MONITORING EMISSIONS FROM A VEHICLE FLEET

(71) Applicant: Ford Global Technologies, LLC, Dearborn, MI (US)

(72) Inventors: Christian Winge Vigild, Aldenhoven (DE); Daniel Roettger, Eynatten (BE); Frederik De Smet, Genk (BE); Eduardo Pérez Guzmán, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 16/813,997

(22) Filed: Mar. 10, 2020

(65) Prior Publication Data

US 2020/0294330 A1    Sep. 17, 2020

(30) Foreign Application Priority Data

Mar. 11, 2019  (DE) .......................... 102019203275.3

(51) Int. Cl.
*G07C 5/08* (2006.01)
*G07C 5/00* (2006.01)
*F02D 41/02* (2006.01)
*F01N 11/00* (2006.01)

(52) U.S. Cl.
CPC .............. *G07C 5/085* (2013.01); *F01N 11/00* (2013.01); *F02D 41/0235* (2013.01); *G07C 5/008* (2013.01); *F02D 2200/1002* (2013.01); *F02D 2200/501* (2013.01)

(58) Field of Classification Search
CPC ...... G07C 5/085; G07C 5/008; G07C 5/0808; F01N 11/00; F02D 41/0235; F02D 2200/1002; F02D 2200/501; Y02T 10/40; G01N 33/0004; G01N 33/0037; G01N 33/004; G01N 33/0042; G01N 33/0047; G01N 33/0062
See application file for complete search history.

(56) References Cited

U.S. PATENT DOCUMENTS

| | | | | |
|---|---|---|---|---|
| 8,131,456 B2* | 3/2012 | Mahalingaiah | ........ | G07C 5/006 701/117 |
| 9,729,639 B2* | 8/2017 | Sustaeta | ................ | H04L 67/125 |

(Continued)

FOREIGN PATENT DOCUMENTS

| CN | 105374203 A | 3/2016 |
|---|---|---|
| EP | 2390861 B1 | 3/2017 |

OTHER PUBLICATIONS

Measuring Real-World Emissions With TNO's Smart Emissions Measurement System (SEMS) (14 pages).

*Primary Examiner* — Sizo B Vilakazi
(74) *Attorney, Agent, or Firm* — Michael Spenner; Eversheds Sutherland (US) LLP

(57) ABSTRACT

The disclosure relates to a method for monitoring emissions from a vehicle fleet consisting of a plurality of vehicles of a certain classification group. The method comprises the steps indicated in claim 1 with a) to e), as well as the further features listed there. With the method according to the disclosure, the emission emitted from a vehicle fleet can be reduced. Furthermore, by means of such an emission monitoring method more environmentally friendly and lower-emission vehicles can be developed.

10 Claims, 1 Drawing Sheet

(56) References Cited

U.S. PATENT DOCUMENTS

| | | | |
|---|---|---|---|
| 2013/0232027 A1* | 9/2013 | Reich | G06Q 30/0631 |
| | | | 705/26.7 |
| 2015/0204758 A1* | 7/2015 | Schnell | G06Q 10/0631 |
| | | | 73/114.13 |
| 2017/0182447 A1* | 6/2017 | Sappok | F01N 3/021 |
| 2019/0070547 A1* | 3/2019 | Sappok | F01N 11/00 |
| 2019/0227043 A1* | 7/2019 | Jackson | F01N 9/00 |

* cited by examiner

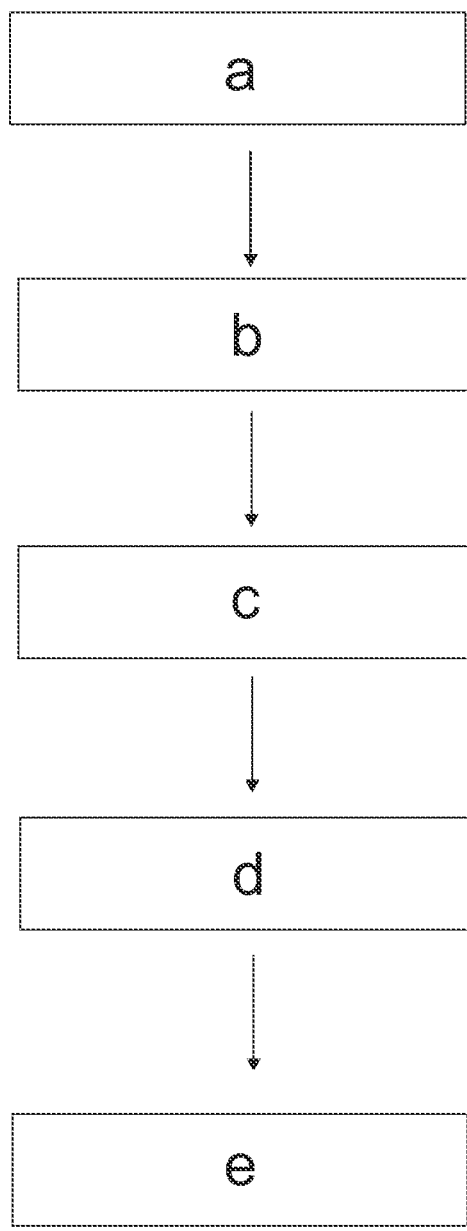

METHOD FOR MONITORING EMISSIONS FROM A VEHICLE FLEET

CROSS-REFERENCE TO RELATED APPLICATIONS

The present disclosure claims priority to and the benefit of DE Application No. 102019203275.3, filed Mar. 11, 2019, which is hereby incorporated by reference herein in its entirety.

FIELD

The present disclosure relates to a method for monitoring emissions from a vehicle fleet that comprises a plurality of vehicles of a certain classification group.

BACKGROUND

In many countries, there are rules and regulations on the maximum pollutant emission of motor vehicles. As an example concerning this matter, the WLTC (Worldwide harmonized Light Duty Test Cycle) regulation is to be mentioned. For example, the European Union has set itself the goal of achieving an emission level for a vehicle fleet of maximally 95 g carbon dioxide per kilometer for passenger cars and 147 g carbon dioxide per kilometer for commercial vehicles in the years 2020/2021. The emissions are measured according to the NEDC (New European Driving Cycle) test specification. From the year 2030, the average pollutant emission of a fleet of new passenger cars is to be 30% lower than in the year 2021.

There are also a number of other regulations on the maximum permissible pollutant emissions from motor vehicles. These are mainly concerned with the emissions that motor vehicles produce while driving. This concerns primarily gaseous pollutants, e.g. nitrogen oxides ($NO_x$ for short), carbon dioxide ($CO_2$) and particulate pollutants such as soot. These regulations are aimed exclusively at vehicles with combustion engines, for example diesel engines. However, gasoline engines and other engine types are not excluded. Accordingly, the present disclosure covers in principle vehicles with all of the aforementioned engine types.

For the purposes of the present patent application, reference is made in particular to Regulation No. 83 of the United Nations Economic Commission for Europe (UN/ECE)—Uniform provisions concerning the approval of vehicles with regard to the emission of pollutants from the engine according to the engine fuel requirements. Reference is also made to "Vehicles Emissions In-Service Conformity", February 2017, of the European Automobile Manufacturers Association.

Motor vehicles are understood to mean in particular passenger cars to which Regulation No. 83 refers, but this does not exclude other motor vehicles. Sensors are used to record the respective emissions emitted by the motor vehicles during operation (e.g. while driving). It is generally known that the emissions recorded during operation sometimes differ significantly from those recorded during standardized approval tests or test methods. The emission values recorded during real driving operation make impermissible interventions in the cleaning system, for example a shut-off device activated only during a test, pointless, because emissions are not only recorded during operation with an active shut-off device, but over a longer operating period. This reduces the probability of tampering.

The Dutch organization TNO (cf. www.tno.nl) describes a measurement method for emissions and a corresponding portable device, which is designated by the acronym SEMS or PEMS. The latter has a relatively small size and can be easily accommodated in a passenger car. The device records the emissions of the motor vehicle during operation or driving via sensors. According to TNO, if a fleet of motor vehicles as a whole is equipped with such a device, the emissions can be recorded in real time and linked to the current traffic situations. A corresponding diagnostic system for emission control can be installed in individual vehicles.

From US 2015/204758 A1, a method and a device for monitoring a fleet of engine-powered auxiliary devices (especially lawnmowers) is known. Here, the operating states of the lawnmowers, which are transmitted by the individual members of the fleet to a central management device, are monitored via suitable sensors. In this way, information on fuel supplies, temperatures, possible theft, etc. can be collected and processed centrally.

From EP 2 390 861 B1, a method and a communication server for traffic control are known. This relates mainly to offering and calculating alternative routes in order to be able to bypass an area that is heavily affected by emissions. It is assumed here that a consumption of one liter of fuel corresponds approximately to an emission of 2.4 kg $CO_2$, so that an emission sensor aiming at $CO_2$ is unnecessary in the vehicles.

As society becomes increasingly mobile, road traffic is also always increasing. This inevitably leads to a higher total emission of vehicle emissions. Increased vehicle emissions, especially soot particles, nitrogen oxides and carbon dioxide, can have serious consequences for the environment, humans and climate development. Accordingly, there is growing interest in reducing emissions on the one hand and in effective emission monitoring of motor vehicles on the other. Such monitoring mainly serves the purpose of complying with statutory limit values. However, for the future development of lower-emission vehicles, advanced knowledge of the emission behavior of certain vehicle fleets is indispensable.

SUMMARY

Accordingly, the object underlying the present disclosure is to provide a method for monitoring emissions from a vehicle by means of which the emissions of the vehicle fleet can be reduced and based on which more environmentally-friendly and lower-emission vehicles can be developed.

As a solution to this object, a method with the features of claim 1 is proposed.

As already mentioned at the beginning, the present disclosure relates to a method for monitoring emissions from a vehicle fleet. The method underlying the disclosure can be used for those vehicle fleets which consist of a plurality of vehicles of a certain classification group. For example, the vehicle fleet may be a number of vehicles manufactured in one production batch. It can also be a number of vehicles that have been sold by a particular manufacturer or seller within a defined period of time and that are to be associated with a particular sales batch. The method according to the disclosure allows a manufacturer or seller to monitor the emission levels emitted by the vehicles belonging to a vehicle fleet. The data determined in this way can be used, for example, for routine adjustment of configuration parameters of the vehicle. At the same time, these values can also be used to develop lower-emission vehicles. Furthermore, the vehicle fleet can refer to a vehicle fleet associated with a vehicle rental system. A vehicle rental system can be understood as a Car-Sharing system as well as a classic vehicle rental system. It can also be of great interest to operators of such a vehicle rental system to monitor the emissions emitted by the associated vehicles as precisely as possible, for example in order to comply with legal requirements on vehicle emissions.

The method according to the disclosure comprises the following steps:

a) equipping vehicles belonging to a first group of the vehicle fleet with a first sensor arrangement for recording emission measurement values of at least one emission category, for example nitrogen oxides or soot particles, wherein the first sensor arrangement comprises at least one emission sensor of a first sensor category;

b) equipping vehicles belonging to a second group of the vehicle fleet with a second sensor arrangement for recording emission values of at least one emission category, for example nitrogen oxides or soot particles, wherein the second sensor arrangement comprises at least one emission sensor of a second sensor category;

c) in the respective vehicles: recording the emission values with the at least one emission sensor and, if necessary, recording vehicle characteristics of at least one characteristics category with a measuring device provided for this purpose;

d) transmitting the emission values and, if necessary, vehicle characteristics to an external computing and/or storage unit, in particular a server;

e) statistically evaluating the transmitted emission values and vehicle characteristics with respect to the vehicle fleet.

A decisive aspect of the disclosure is that the at least one emission sensor of the first sensor category has a measuring accuracy multiple times higher than the at least one emission sensor of the second sensor category.

As already mentioned in the context of the aforementioned method steps a) and b), a first group of vehicles of the vehicle fleet is provided with a first sensor arrangement. Furthermore, a second group of vehicles of the vehicle fleet is provided with a second sensor arrangement. The first and second sensor arrangements may comprise one or more emission sensors. A plurality of individual emission sensors can be provided within a sensor arrangement for the detection of the emissions of an emission category. Also, a plurality of emission sensors may be provided within a sensor arrangement for the detection of emissions of different emission categories. In this context, emission categories refer to the various components of the exhaust gases emitted by the vehicles. As exemplary components, the following ones are to be mentioned: nitrogen oxides ($NO_X$), soot, particulate matter, volatile organic compounds (VOCs), carbon dioxide ($CO_2$), sulphur dioxides ($SO_X$), carbon monoxide (CO), hydrocarbons and heavy metals. The list above is not exhaustive.

The first and second sensor arrangements may be located at a suitable place in the vehicle, for example they may be arranged downstream of an $NO_X$ catalyst in the direction of the exhaust port. The sensor arrangement may also consist of a plurality of individual emission sensors arranged in the same place or in different positions on the vehicle. Thus, in addition to an arrangement downstream of an $NO_X$ catalytic converter, the sensors may also be arranged downstream of a 3-way catalytic converter, for example. In principle, the emission sensors can be arranged at any position between the combustion chamber of the engine and the port of the exhaust pipe. It can also be useful to arrange emission sensors of the same type at different points of the exhaust gas path. This allows a spatial course monitoring of the exhaust gas composition along the exhaust gas path. Arranging a plurality of emission sensors at the same point of the exhaust gas path may also be advantageous, especially with a view to checking the measuring accuracy. It is conceivable to distribute the sensors, at a certain point of a cylindrical pipe (e.g. exhaust pipe), radially symmetrically at different locations. In this way the measured values can be checked redundantly. Thus, the sensor arrangement can comprise a plurality of individual sensors, wherein the sensors—in relation to the exhaust gas path—can be arranged at different points. The above explanations—regarding the first sensor arrangement—apply equally to the second sensor arrangement.

The first and second groups can basically consist of any number of vehicles. However, it has to be considered that although a high number of vehicles equipped with the first or second sensor arrangement is accompanied by an increased statistical monitoring accuracy, it also involves increased costs. Accordingly, the disclosure utilizes the fact that a smaller number of vehicles is associated with the first group, thus, in relation to the total number of vehicles of a vehicle fleet, fewer vehicles are equipped with the first sensor arrangement than with the second sensor arrangement. This is important because the emission sensors of the first sensor arrangement are sensors which have a measuring accuracy which is multiple times higher. For example, the measuring accuracy of the emission sensors of the first sensor arrangement can be at least 2 times, 3 times, 4 times or preferably 5 times higher than the measuring accuracy of the emission sensors of the second sensor arrangement. Increased measuring accuracy results in that the error variance with regard to possible measurement errors is reduced. Accordingly, the provision of such high-performance sensors—in comparison to emission sensors of lower measuring accuracy—involves significantly higher costs. Accordingly, it may be provided within the scope of the disclosure to equip only a small number of vehicles of the vehicle fleet with the first sensor arrangement (comprising high-performance emission sensors), while a larger number of vehicles is equipped with the second sensor arrangement (emission sensors of the second sensor category). There may also be an overlap of vehicle groups, so that a certain proportion of vehicles is provided with both a first sensor arrangement and a second sensor arrangement. For example, 0.1% of those vehicles belonging to the vehicle fleet may be equipped with a first sensor arrangement while 1% of the vehicles are equipped with the second sensor arrangement.

As already mentioned, the emission values in method step c) are recorded in the respective vehicles using the at least one emission sensor (of the first and/or second sensor category) present there. If necessary, further vehicle characteristics of at least one characteristics category can also be recorded using a measuring device provided for this purpose. The further vehicle characteristics that are recorded can be taken into account, for example, in the statistical evaluation or monitoring of the emission values. The vehicle characteristics can also be taken into account in modeling or in simulations based on the recorded emission values, for example in terms of the boundary conditions on which modeling is based (so-called "boundary conditions").

The measuring devices are not limited to an arrangement in the exhaust system. They can comprise any measuring device existing or arranged in the vehicle. In particular, they can also be arranged in the area of the vehicle engine or in the vehicle interior. An arrangement on the outside of the vehicle, for example on the vehicle chassis, the wheels, the transmission or the brake devices is also possible. Even a GPS system provided on the vehicle can be understood as a measuring device. Accordingly, position, speed and route data of the vehicle can be understood as vehicle characteristics within the meaning of the present disclosure. However, the method according to the disclosure can also be carried out without the mentioned measuring devices or the detection of additional vehicle characteristics.

A control system which is connected to the emission sensors of the first or second sensor arrangement by means of a signal may be provided in the vehicles. The other measuring devices may also be connected to the first or second sensor arrangements and/or the control system be means of a signal. The recorded emission values and, if necessary, also the vehicle characteristics can be stored or temporarily stored in the control system.

Also, pre-processing of the recorded values can take place in the control system. The control system can also be configured to convert the recorded values into a data format suitable for wireless data transmission. The data can also be converted into compressed data records in the control system. The control system can also perform on-board monitoring of emission values, wherein monitoring is coupled to fuel usage. This can mean that the fuel consumption is adjusted to suit the situation if emissions exceeding a specified level are recorded. The control system may also be configured to give the driver of the vehicle—depending on the current emission level—a recommendation to adjust the driving style, in particular with regard to vehicle speed or vehicle gear.

According to method step d) of the method underlying the disclosure, the emission values and, if necessary, vehicle characteristics are transmitted to an external computing and/or storage unit, in particular a server. For this purpose, the on-board control system may be equipped with a transceiver module so that the emission values and vehicle characteristics can be sent out wirelessly (for example via a wireless telecommunication system or radio network). The networks for mobile data transmission (mobile radio networks) are particularly suitable for transmitting the data. For example, data transmission via telecommunication standards such as GSM, EDGE, UMTS, LTE or higher is possible.

However, it is also possible to transmit the data over shorter ranges by means of wireless data transmission, for example when the vehicle stops in a workshop. Data transmission via Bluetooth, WLAN or WiMAX is particularly suitable for this purpose.

According to the disclosure, it can be provided that those vehicles equipped with the first sensor arrangement, thus, those vehicles which have high-precision emission sensors, permanently wirelessly transmit the recorded emission values to the external computing and/or storage unit (this includes a continuous or periodic transmission of the emission values). It can also be provided that those vehicles equipped with the second sensor arrangement, thus, those vehicles which have standard emission sensors, do not continuously transmit the emission values to the external computing and/or storage unit. For example, the emission values can be accessed during workshop visits (for example, during a routine inspection or repair) and transmitted to the external computing and/or storage unit. This can be done wirelessly or via cable. For wireless data transmission, e.g. in a workshop, however, a local communication system is sufficient; in this case data transmission preferably takes place via WLAN or Bluetooth. Alternatively, it may be provided within the scope of the disclosure that both the emission values recorded with the first sensor arrangements in the vehicles of the first group and the emission values recorded with the second sensor arrangements in the vehicles of the second group are permanently transmitted wirelessly to the external computing and/or storage unit. Finally, the concrete configuration of the data transmission depends on the time interval for querying or monitoring that the user of the method wants. If permanent monitoring is desired, continuous data transmission is preferred. However, even in this case, it can be provided, for example, to continuously transmit only the emission values determined in the vehicles of the first group. This is because these data provide meaningful results of high reliability, due to the measuring accuracy that is multiple times higher. The emission values of the vehicles of the second group can then be added as required or at fixed time intervals, for example to check the measuring accuracy of the existing measured values of the first vehicle group or to provide a broader basis for statistical evaluation.

The recorded and reported emission values of the first and second vehicle groups thus provide the basis for a statistical analysis of the emission values related to the vehicle fleet. As mentioned in step e) of the method according to the disclosure, the statistical analysis can be based on additional vehicle characteristics. This aspect will be discussed separately later on. The statistical evaluation can be provided for matching with specified emission limit values or emission value distributions. Such target values can be specified by the legislator or the state, for example. The data analyzed by way of statistical evaluation can also be used as the basis for predicting or modeling emission values or value distributions.

Further advantageous configurations of the disclosure are specified in the subclaims. In the following, the features of these advantageous configurations are described separately and supplemented by further advantageous configuration possibilities.

According to a first advantageous configuration, the classification group refers to a defined vehicle category or vehicle model. The vehicles belonging to the vehicle fleet are all to be associated with one classification group, i.e. they are similar with regard to this feature. As mentioned, the classification group can refer to a specific vehicle category. This means that all vehicles in the vehicle fleet originate from a specific vehicle category. The following categories can be considered as vehicle categories or vehicle type: mini cars (minis), small cars, compact cars, lower middle class cars, middle class cars, upper middle class cars, upper class cars, luxury class cars, sports cars, minivans, vans, commercial vehicles, sports utility vehicles (SUVs), off-road vehicles and four-wheel drive vehicles. This list is not exhaustive.

Such a classification may be useful, since the vehicles belonging to the different classes (due to their different construction) have differences in motorization, fuel consumption, interior size and driving characteristics. Furthermore, the classification group may refer to a specific vehicle model. The classification group can—with reference to the vehicle manufacturer "Ford"—be differentiated, for example, by distinguishing between the models Ford Focus or Ford Focus FCV Hybrid. The example given is of exemplary nature only.

According to a further advantageous configuration, it can be provided that the emission values and, if necessary, vehicle characteristics are recorded continuously or discontinuously during vehicle operation and transmitted to the external computing and/or storage unit.

Continuous measurement value recording means that the emission values and/or vehicle characteristics are continuously sensed and/or otherwise recorded. In terms of time, continuous measurement is limited by the achievable temporal resolution, thus by the number of measured values that can be recorded per unit of time. In the case of discontinuous measurement value recording, however, the emission values are recorded periodically or by means of a spontaneous query. For example, it may be provided to sense or record the emission values and/or vehicle characteristics at a defined time interval, for example hourly, daily, weekly, monthly, etc. A spontaneous query can be carried out in such a way that a request for transmission of the emission data is sent out towards a vehicle via the external computing unit. Once the vehicle has received the request, the data can be transmitted wirelessly. The same can be done during the vehicle's regular or spontaneous workshop visits while the emission data are simultaneously accessed. In this case, the data transmission can also be done by cable. It may be advantageous that the emission values and, if necessary, vehicle characteristics of those vehicles belonging to the first group of vehicles are transmitted continuously and wirelessly, while the emission values and, if necessary, vehicle characteristics of those vehicles belonging to the second group of vehicles are transmitted discontinuously. It should be expressly noted that discontinuous data transmission is not the same as discontinuous data acquisition or sensing. This is because in the vehicles, the emission values and, if necessary, vehicle characteristics can be continuously sensed and/or recorded, wherein they are transmitted only discontinuously to the external computing and storage unit. This means that the sensed and/or recorded emission values and, if necessary, vehicle characteristics are temporarily stored for a certain period of time (between data transmission) on a corresponding storage unit of the vehicle. The storage unit may be part of the control system provided in the vehicles.

In another advantageous configuration, an internal control system, by means of which the emission values and vehicle characteristics are subjected to pre-processing, can be provided in the vehicles. For this purpose, the control system may include a computing unit. The computing unit may be integrated in a vehicle's own computing unit, but it may also be a separate computing unit located in the vehicle. Pre-processing can be configured in such a way that the raw data determined for the emission values and, if necessary, vehicle characteristics are converted into a desired data format. Data compression or sorting of the data can also be understood as pre-processing. Furthermore, pre-processing can be accompanied by certain data processing steps, for example, data can be converted, matched or subjected to statistical analysis.

Similarly, the emission values and, if necessary, vehicle characteristics may be temporarily stored in the control system. For this purpose the control system may comprise a storage unit. The storage unit and the computing unit may be configured as a common data processing unit, for example all components may be arranged on a common circuit board. Furthermore, the control system may include a communication unit with which the data can be transmitted wirelessly or by cable. For this purpose, the communication unit is connected to the other components (at least the storage unit and the computing unit) of the control system by means of signals.

According to another configuration, it can be provided that the control system executes a routine with which the fuel use is controlled as a function of the exhaust gas composition. The routine can be executed continuously during vehicle operation, for example while driving, in order to adapt the fuel consumption to the current driving situation, namely in such a way that exceeding predetermined emission limits is avoided. The routine can be based on the results obtained by statistical evaluation of the fleet-related emission values. The data thus obtained can be defined, for example, as fleet-internal target emission parameters and thus serve as an internal limit value for which the vehicle's internal routine is optimized and designed. However, the routine can also be based on other target or limit values, for example those values that result from legal requirements. The routine is based on the fact that fuel usage is controlled as a function of exhaust gas composition and engine behavior. The exhaust gas composition is monitored (via emission sensors coupled to the control system) in such a way that specified or determined emission limit values are not exceeded. For this purpose, the routine may include a subroutine that performs dynamic modeling or an estimation of the current fuel consumption or engine behavior. The routine may also comprise a subroutine by means of which an adjustment of the current emission values to predefined values is tracked. The routine may be a closed-loop control loop which can be optimized or adapted based on the data obtained by the method according to the disclosure.

According to another configuration of the disclosure, the control system may be continuously or discontinuously subjected to a system update, wherein the system update is based on the statistical evaluation carried out in step e) according to claim 1. By means of the statistical evaluation, vehicle fleet-related emission values (for example in the form of an emission value distribution over the number of vehicles in a fleet) can be matched with legal requirements. Based on these results, the control system can be updated regularly or as required. For example, it is conceivable that the emissions balance of a vehicle fleet may change due to technical adjustments to the vehicles or for other reasons. In order to ensure that the emissions balance of the vehicle fleet permanently complies with the legal framework, it may be necessary to adapt the control system to these changes, for example by means of a system update.

According to another configuration of the disclosure, the characteristics category can be selected from the temperature of the exhaust system, the torque of the engine, the air mass flow or the speed of the vehicle. Other parameters, such as environmental or route-related data, can also define the characteristics category. For example, environmental data can relate to outdoor temperature, weather, precipitation values, or wind speed. Route-related data can, for example, relate to route information (gradient or elevation profile) or the road condition. All of the above parameters can influence the fuel consumption of a vehicle. Consequently, emissions are also influenced by these factors, at least indirectly. Therefore, these data may need to be taken into account in the statistical evaluation or emission monitoring of a vehicle fleet, if necessary.

According to another configuration of the disclosure, a frequency distribution of emission values related to the vehicle fleet can be determined by means of statistical evaluation, wherein the determined frequency distribution is subjected to a matching with predetermined values and/or a specified frequency distribution. The determined frequency distribution represents the relative or absolute frequency of certain emission values in relation to the total number of vehicles belonging to the vehicle fleet. The emission values of the individual vehicles on which the frequency distribution is based can be values averaged over a certain time interval, for example the average emission value that a vehicle has emitted over a period of one month. If necessary, further vehicle characteristics can be taken into account by computer in the determination of the emission frequency distributions. This also applies to the case where frequency distributions are to be simulated or modeled on the basis of the determined emission values.

The specified values or the specified frequency distribution can be statutory limit values for emissions. These emission limit values or distributions can be specified by the legislator for a certain classification group of vehicles. The specified values or frequency distribution can also be internal values, for example, internal specifications of a vehicle manufacturer or vehicle fleet operator (for example, an operator of a vehicle rental system or a taxi company). Such internal values can be internal target values or reference values for vehicle emissions. With the method according to the disclosure, an operator of a vehicle fleet or a vehicle manufacturer can control and further develop the emission efficiency of his vehicle fleet.

According to another advantageous configuration of the disclosure, as a result of the matching, a conformity assessment can be carried out with regard to the frequency distribution of the emission values, wherein the result of the conformity assessment is taken into account in the system update and/or in the manufacture of new vehicles. In the course of the conformity assessment it is determined whether the frequency distribution of the vehicle fleet-related emission values deviates from a predetermined frequency distribution or limit values or whether it lies within a permissible or desired range. Distribution curves can be compared, e.g., in terms of the distribution width, standard deviation (or a multiple of the standard deviation, for example a twofold or threefold standard deviation), full width at half maximum, or the shape of the distribution curve. Absolute emission values can also be used for comparing with specified values. If a frequency distribution of emission values is displayed graphically, an emission value scale can be shown on the abscissa and the relative frequency on the ordinate. If the distribution curve in relation to the abscissa position is shifted beyond a certain limit value range, this can lead to a negative conformity assessment. In such comparisons, tolerances based on measurement errors or statistical variations may be taken into account. Conformity assessment is preferably performed by the external computing unit, but can also be performed manually. If the conformity assessment is positive (in which case the frequency distribution of the measured emission values may be within a specified range), technical adaptations of the vehicles or the on-board control system are normally not necessary. However, if the conformity assessment is negative (thus, if predetermined parameters are exceeded), technical adaptations or an update of the routine underlying the on-board control system may become necessary.

Accordingly, with the method according to the disclosure for monitoring emissions, operators of a vehicle fleet can carry out efficient and, if necessary, automated self-monitoring of vehicles belonging to their fleet. In this way it can be avoided that statutory limit values for vehicle emissions are not met. As a consequence, this also means that any penalties, if applicable, that may become due if emission limits are exceeded can be worked around or avoided.

BRIEF DESCRIPTION OF THE DRAWINGS

Further details of the disclosure are explained in more detail by means of the exemplary embodiment or diagram of the process flow shown in FIG. 1. In the drawing:

FIG. 1 shows a schematic flow chart of the process flow of the method according to the disclosure.

DETAILED DESCRIPTION

As already mentioned at the beginning, the disclosure relates to a method for monitoring emissions of a vehicle fleet. Such a vehicle fleet comprises a plurality of vehicles of a certain classification group (this may be a certain vehicle category, a vehicle type or a vehicle model). Such a fleet may, for example, relate to a production series of vehicles from a particular manufacturer, wherein the manufacturer has a particular interest in monitoring the emissions of his vehicles, either to ensure compliance with legal requirements or to optimize the vehicles with a view to achieving low emissions. Operators of vehicle rental systems, taxi companies or bus companies may also have an interest in monitoring emissions, either to promote their own fleet with a view to ensuring low emissions or to comply with legal requirements.

In method step a) of the method according to the disclosure, a first group of vehicles belonging to the vehicle fleet is equipped with a first sensor arrangement for recording emission measurement values of at least one emission category, for example nitrogen oxide or soot particles (this list is not exhaustive). The first sensor arrangement comprises at least one emission sensor of a first sensor category. The at least one emission sensor of the first sensor category is a high-precision emission sensor, thus, a high-performance sensor. The first sensor arrangement can also easily comprise a plurality of emission sensors, wherein the individual emission sensors can be designed to record emissions of the same or of several different emission categories. Recording emissions of the same emission category with several emission sensors at the same time, e.g. several $NO_x$ sensors, can further increase the measuring accuracy. It should be noted that during a sensor-based measurement value recording, noise values are in principle recorded as well. Such noise values, on the one hand, can be reduced by a large number of repeated measurements or by a redundant arrangement of a number of emission sensors of the same type. Noise, possible measurement errors and statistical measurement value fluctuations can be reduced by means of averaging. The emission sensors can, for example, be arranged in the area of the exhaust gas path of the vehicle.

In method step b) of the method according to the disclosure, a second group of vehicles belonging to the vehicle fleet is equipped with a second sensor arrangement for recording emission measurement values of at least one emission category, for example nitrogen oxide or soot particles (this list is not exhaustive). The second sensor arrangement comprises at least one emission sensor of a second sensor category. The at least one emission sensor of the second sensor category is a standard sensor in comparison to the at least one emission sensor of the first sensor category, this means that the measuring accuracy is multiple times lower than with the emission sensors of the first sensor category. However, the standard sensors of the second sensor category are generally less expensive than the high-performance sensors of the first sensor category due to their lower performance.

An aspect of the disclosure is that only a small proportion of vehicles in the vehicle fleet are equipped with the first sensor arrangement (thus with high-performance sensors of high measuring accuracy), while a larger number of vehicles is equipped with the second sensor arrangement (emission sensors of the second sensor category or standard sensors). There may also be an overlap between vehicle groups, so that a certain proportion of vehicles is equipped with both a first sensor arrangement and a second sensor arrangement. For example, 0.1% of those vehicles belonging to the vehicle fleet may be equipped with a first sensor arrangement, while 1% of the vehicles are equipped with the second sensor arrangement. On the one hand, this creates a sufficiently large test group (consisting of the sum of the vehicles of the first and second group), and on the other hand, it avoids equipping all vehicles of the test group with cost-intensive high-performance emission sensors. In comparison to an emission monitoring method, in which the vehicles would be equipped exclusively with standard sensors, the present disclosure provides a higher accuracy in determining fleet-related emission distributions due to the presence of at least some high-performance sensors in the vehicles of the first vehicle group. The accuracy of the emission distribution curves is thus improved by the method according to the disclosure.

In method step c), emission values are recorded in the respective vehicles (both the first group and the second group) with the at least one emission sensor. Preferably, the values are recorded continuously and are at least temporarily stored within the vehicle. The recorded values can then be transmitted to an external computing and/or storage unit in accordance with method step d). For example, the recorded emission values can be transmitted wirelessly to the external computing and/or storage unit via a suitable data communication network. This can take place continuously, but also at fixed time intervals. A query-based data transmission is also possible.

However, it may also be provided that vehicles equipped exclusively with standard sensors transmit the recorded emission values only during regular or spontaneous workshop visits. With such a configuration, components specifically required for continuous data transmission can be dispensed with, which would further reduce costs. However, the disclosure is not limited to such a method configuration.

The time intervals at which the emission data are transmitted to the external computing and/or storage unit and the concrete way in which they are transmitted ultimately depend on the specific desired requirements for emission monitoring, in particular with regard to the temporal resolution, actuality and accuracy of the determinable fleet-related emission distributions.

According to method step c), if necessary, further vehicle characteristics of at least one characteristics category can be recorded in the vehicles in addition to the emission values, using a measuring device provided for this purpose. The measuring devices may be any measuring devices present or arranged in the vehicle. The vehicle characteristics may be, for example: the temperature in the exhaust system, the torque of the engine, the air mass flow or the speed of the vehicle. In addition, the vehicle characteristics may relate to position, speed and route data of the vehicle.

The vehicle characteristics can also be transmitted to the external computing and/or storage unit in method step d). For details of the data transmission, reference is made to the previous explanations. However, it should be mentioned that the vehicle characteristics are preferably transmitted to the external computing and/or storage unit in a data packet accompanying the emission data.

In method step e), the transmitted emission values and, if necessary, vehicle characteristics are statistically evaluated with regard to the vehicle fleet. The recorded and transmitted emission values and, if necessary, vehicle characteristics of the first and second vehicle groups thus provide the basis for a statistical analysis of the emissions emitted by the vehicle fleet. The statistical evaluation can be used for matching with specified emission limits or emission value distributions. Such target values can be specified by the legislator or the state, for example. The data analyzed by means of statistical evaluation can also be used as a base for predicting or modeling emission values or value distributions.

An illustrative example for a concrete configuration of the emission monitoring method according to the disclosure is described below. The numerical values and ranges mentioned here are explicitly of exemplary nature only.

Accordingly, the method according to the disclosure can be used, for example, to monitor $NO_x$ emissions of a vehicle fleet consisting of a number of 100,000 vehicles. Such a fleet may be the annual production of a certain type of vehicle. With the method underlying the disclosure, vehicle emissions of the vehicles produced in one year are to be monitored. The vehicles of a first group (a proportion of 0.1% of the 100,000 vehicles) are equipped with a first sensor arrangement, thus with emission sensors of the first sensor category (the high-performance sensors), while the vehicles of a second group (a proportion of 1% of the 100,000 vehicles) are equipped with a standard emission sensor of the second sensor category. During measurement recording, the emission values are recorded with time resolution. The recorded signal usually comprises a signal component and a noise component. However, the noise component of the signal can be reduced or eliminated by suitable techniques. Mathematical methods for filtering out or calculating the noise component may be suited for this purpose. For example, the emission sensors of the first sensor category can record the measurements with an accuracy of about 3%, while the emission values recorded with the standard emission sensors of the second sensor category can have a measurement error of up to 15%.

By means of statistical evaluation, frequency distributions can be generated from the determined emission values (both the emission values determined with the emission sensors of the first sensor category and the emission values determined with the emission sensors of the second sensor category). The latter show the frequency of certain emission values in relation to the vehicle fleet, thus, how often a certain emission value was measured. The frequencies can be given in relative units, for example as a percentage frequency. Furthermore, the frequency distributions can be evaluated and displayed in relation to different time intervals, for example, the frequency distributions of the emission values can represent the emissions of a week, month or year. The frequency distributions can be compared with specified target frequency distributions which, in turn, can be specified by a legislator, vehicle manufacturer or fleet operator. The other vehicle characteristics can be included when creating the frequency distributions.

The invention claimed is:

1. A method for monitoring emissions from a vehicle fleet that comprises a plurality of vehicles of a certain classification group, the method comprising the following steps:

equipping vehicles belonging to a first group of the vehicle fleet with a first sensor arrangement for recording emission measurement values of at least one emission category, wherein the first sensor arrangement comprises at least one emission sensor of a first sensor category;

equipping vehicles belonging to a second group of the vehicle fleet with a second sensor arrangement for recording emission values of at least one emission category, wherein the second sensor arrangement comprises at least one emission sensor of a second sensor category;

recording, in the respective vehicles, the emission values with the at least one emission sensor and recording vehicle characteristics of at least one characteristics category with a measuring device provided for this purpose;

transmitting the emission values and vehicle characteristics to an external computing and/or storage unit;

statistically evaluating the transmitted emission values and vehicle characteristics with respect to the vehicle fleet, wherein the at least one emission sensor of the first sensor category has a measuring accuracy multiple times higher than the at least one emission sensor of the second sensor category.

2. The method according to claim 1, wherein in that the classification group relates to a defined vehicle category or vehicle model.

3. The method according to claim 1, wherein in that the emission values and vehicle characteristics are recorded continuously or discontinuously during vehicle operation and are transmitted to the external computing and/or storage unit.

4. The method according to claim 1, wherein in that an internal control system, with which the emission values and vehicle characteristics are subjected to pre-processing, is provided in the vehicles.

5. The method according to claim 4, wherein in that the control system executes a routine with which the fuel utilization is controlled as a function of the exhaust gas composition.

6. The method according to claim 5, wherein in that the control system is subjected continuously or discontinuously to a system update, and wherein the system update is based on the statistical evaluation.

7. The method according to claim 1, wherein in that the vehicles belonging to the first group are additionally equipped with at least one emission sensor of the second sensor category.

8. The method according to claim 1, wherein in that the characteristics category is selected from the temperature in the exhaust system, the torque of the engine, the air mass flow or the speed of the vehicle.

9. The method according to claim 1, wherein in that a frequency distribution of emission values related to the vehicle fleet is determined by means of statistical evaluation, and wherein the determined frequency distribution is subjected to a matching with specified values and/or a specified frequency distribution.

10. The method according to claim 9, wherein in that as a result of the matching a conformity assessment with respect to the frequency distribution of the emission values is carried out, and wherein the result of the conformity assessment is taken into account in the system update and/or in the manufacture of new vehicles.

* * * * *